United States Patent
Elwood

(10) Patent No.: US 6,272,409 B1
(45) Date of Patent: Aug. 7, 2001

(54) MOTOR VEHICLE STEERING BOX WITH ACKERMAN CONTROL

(75) Inventor: Paul David Elwood, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/159,929

(22) Filed: Sep. 24, 1998

(51) Int. Cl.$^7$ .................................................. B62D 7/00
(52) U.S. Cl. ................................. 701/41; 701/42; 180/435
(58) Field of Search ...................... 701/41, 42; 180/443, 180/408, 410, 412, 415, 416, 422, 428, 431, 435, 437

(56) References Cited

U.S. PATENT DOCUMENTS

| | | |
|---|---|---|
| 1,908,008 | 5/1933 | Bethenod et al. |
| 2,169,336 | 8/1939 | Best ........................................ 267/20 |
| 2,731,277 | 1/1956 | Pearne ..................................... 280/93 |
| 2,814,499 | 11/1957 | Schlechter .............................. 280/93 |
| 3,617,071 | 11/1971 | Ivancic ..................................... 280/96 |
| 4,440,254 * | 4/1984 | Shibahata et al. .................... 180/140 |
| 4,522,417 | 6/1985 | Sano et al. .............................. 280/91 |
| 4,557,493 * | 12/1985 | Sano et al. .............................. 280/91 |
| 4,880,074 * | 11/1989 | Matsumoto .......................... 180/142 |
| 4,939,436 * | 7/1990 | Morishita et al. .................... 318/434 |
| 5,002,142 * | 3/1991 | Klosterhaus ........................ 180/79.1 |
| 5,143,400 * | 9/1992 | Miller et al. .......................... 280/661 |
| 5,145,022 * | 9/1992 | Kido ................................... 180/79.1 |

* cited by examiner

*Primary Examiner*—Tan Nguyen
(74) *Attorney, Agent, or Firm*—Oldham & Oldham Co., L.P.A.

(57) ABSTRACT

A motor vehicle steering box for use with light duty trucks and other vehicles is provided with a function generation means for specifically controlling Ackerman geometry by independently controlling left and right tie rod links. The invention may be employed regardless of outside ball joint location and in lieu of a conventional rack and pinion steering apparatus.

10 Claims, 5 Drawing Sheets

MOTOR VEHICLE STEERING BOX WITH ACKERMAN CONTROL

The present invention relates to steering systems for motor vehicles. More particularly, the present invention relates to a steering control system that permits achievement of virtually perfect Ackerman geometry. A further benefit to be derived from the system is greater freedom of placement of steering system components among other components of a vehicle.

BACKGROUND OF THE INVENTION

Ackerman steering geometry can be explained by examining the relationships of components of a typical two-wheeled steering system situated on the front axle of a motor vehicle. As the vehicle negotiates a turn in a roadway, both the inside and the outside wheels must be turned to correspond to the turn. In doing so, both wheels take two distinct arc-like paths which ideally will have a common center point that is located at the point of intersection of a line extending inwardly from the rotational center of the rear axle of the vehicle and toward the central region of the turn being negotiated and two similar inwardly extending lines, one of which originates at the rotational center of the inside wheel of the front axle and the other of which has its starting point at the rotational center of the outside wheel of the front axle. For correct steering and to avoid undesirable scrubbing of rubber from the tread region of the tire on the outside wheel, the arc-like path taken by that wheel must have that same center point as the arcuate path taken by the inside wheel. However, because the inside and outside wheels are spaced apart from each other on the front axle, i.e., they have what is commonly called a "track width", the radius of the curved path taken by the outside wheel must be larger than the radius of the path taken by inside wheel. As a consequence, the outside wheel must be turned inwardly at a turning angle that is less than the turning angle provided to the inside wheel. When the center points of inside and outside wheel paths are coincident, a condition known as perfect Ackerman exists. Such a state is desirable in a vehicle dynamics sense, because any deviation from it results in Ackerman error degradation of vehicle handling characteristics.

At the present time, the only means available for controlling Ackerman geometry is generally through the placement of various components of the steering system, and more specifically, through the positioning of the outer tie rod ball joints. Such positioning has often proved to be difficult or impossible, because movement of the outer tie rod ball joints in an outboard direction typically runs into physical constraints within the wheel rims. The present invention facilitates the placement process and helps to better cope with the indicated physical limitations by allowing greater freedom for placement of the tie rod ball joints and other components in a range of locations, which is advantageous for vehicle packaging issues.

SUMMARY OF THE INVENTION

It is therefore an advantage of the present invention to provide a motor vehicle steering box which can be used with light duty trucks and with other vehicles and which is provided with a means for specifically controlling Ackerman geometry regardless of the location of the outside tie rod ball joint and for independently controlling left and right tie rod links. This advantage is provided by a motor vehicle steering box comprising: a function generation means; a first connecting means for linking the function generation means to a steering column and steering wheel of the vehicle steering system; a second connecting means for linking the function generation means to a first tie rod of a linkage apparatus of the steering system; a third connecting means for linking the function generation means to a second tie rod of the linkage apparatus; and a means for ascertaining an angle of rotation of the steering wheel of the steering system when the vehicle makes a turn and for conveying the angle to the function generation means.

This advantage and other novel features of the present invention will become apparent in the following detailed description of the invention when considered in conjunction with the accompanying drawings.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PRESENT INVENTION

Figure 1:
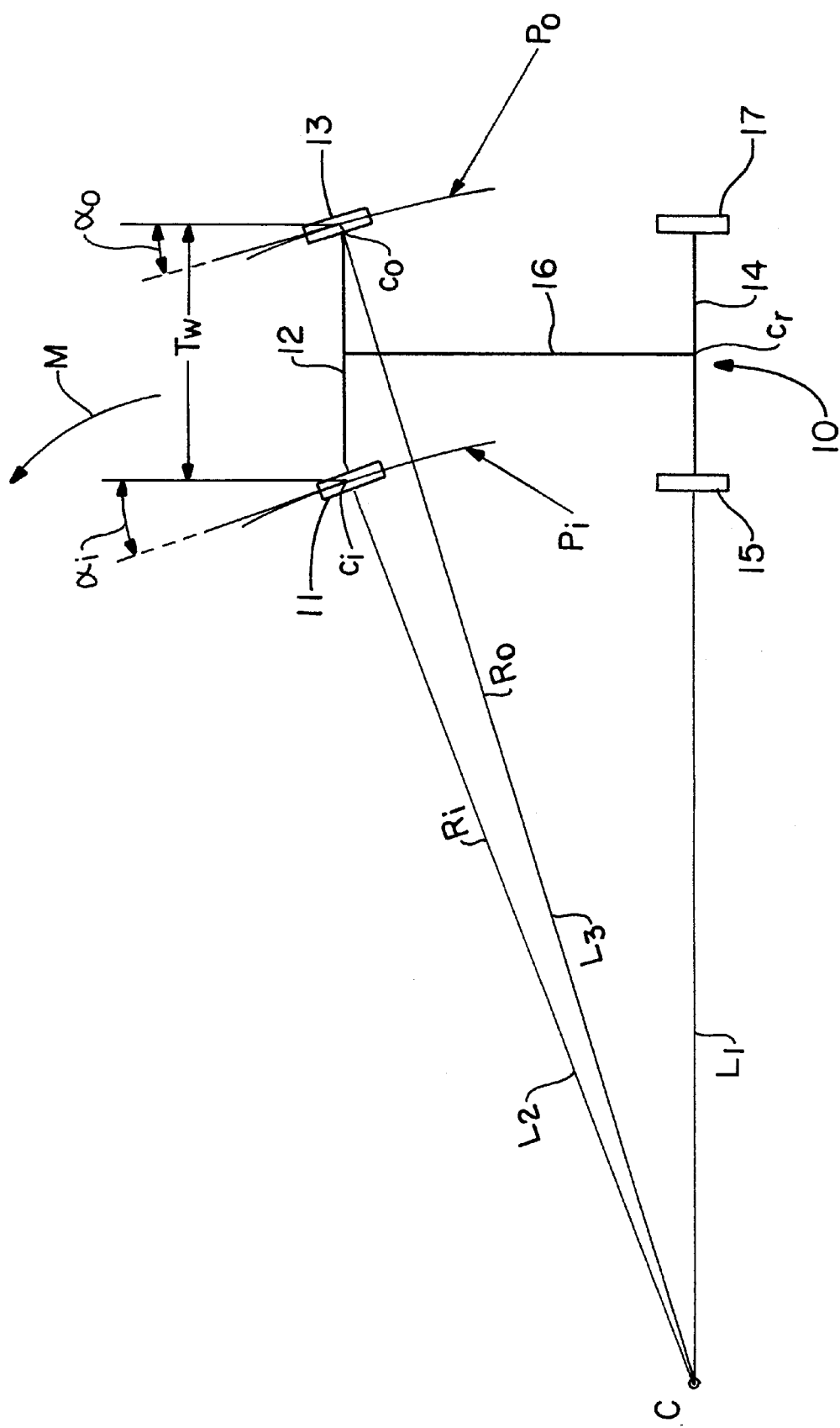
FIG. 1 is a schematic top view of a four-wheeled, double axle motor vehicle with front wheels turned to left to illustrate Ackerman geometry.

FIG. 1 provides a schematic illustration of the Ackerman geometry of a four-wheeled, double axle motor vehicle wherein the front wheels of the vehicle are turned to the left. (The direction in which the wheels are shown to be turned, i.e., to the left or to the right, is immaterial to the invention. The invention could have just as easily been described with the vehicle negotiating a right turn.) The vehicle, which is represented generally by the numeral 10, is shown to have a front axle 12, a rear axle 14, and a structural frame or chassis 16 that extends between and interconnects the front axle 12 and the rear axle 14. The front axle 12 is provided at its opposing ends with two conventional steerable tire/wheel assemblies 11 and 13 and the rear axle 14 is likewise outfitted with two conventional tire/wheel assemblies 15 and 17, both of which are non-steerable. As indicated by the orientation of assemblies 11 and 13 in FIG. 1, the vehicle 10 is making a left hand turn and traveling generally in a counter-clockwise direction designated by the arrow M. In making the turn, it will be observed that front wheels 11 and 13 take two distinct arc-like paths $P_i$ and $P_o$ which ideally will have a common center point C which is located at the point of intersection of a line $L_1$, extending inwardly from the rotational center $c_r$ of the rear axle 14 of the vehicle 10 and toward the central region of the turn being negotiated and two similar inwardly extending lines $L_2$ and $L_3$, which originate respectively at the rotational center $c_i$ of the inside wheel 11 of the front axle 12 and at the rotational center $c_o$ of the outside wheel 13 of the front axle 12. For proper steering and to avoid undesirable scrubbing of rubber from the tread region of the tire on the outside wheel 13, the arc-like path $P_o$ taken by the outside wheel 13 must have the same center point C as the arcuate path $P_i$ taken by the inside wheel 11. However, because the inside and outside wheels 11 and 13 are spaced apart from each other on the front axle at a distance commonly called a track width $T_w$, the radius $R_o$ of the curved path $P_o$ taken by the outside wheel 13 must be larger than the radius $R_i$ of the path taken by the inside wheel 11. As a consequence, the outside wheel 13 must be turned inwardly at a turning angle $\alpha_o$ that is less than the turning angle $\alpha_i$ provided to the inside wheel. When the center points of inside and outside wheel paths are coincident at point C as shown in FIG. 1, a condition of perfect Ackerman exists. Such a state is desirable in a vehicle dynamics sense, because any deviation from it results in Ackerman error degradation of vehicle handling characteristics. As explained hereinbelow, the present invention provides a means for achieving virtually perfect Ackerman geometry.

The present invention is premised upon the notions that for any given steering system arrangement, including inner and outer tie rod locations, there is a set distance that the inner tie rods of the system must move in order to attain a desired wheel angle and that therefore, the typical rack and pinion steering system of a vehicle only needs to be replaced by a function generation device that provides the correct lengths on the inner tie rods.

Figure 2:
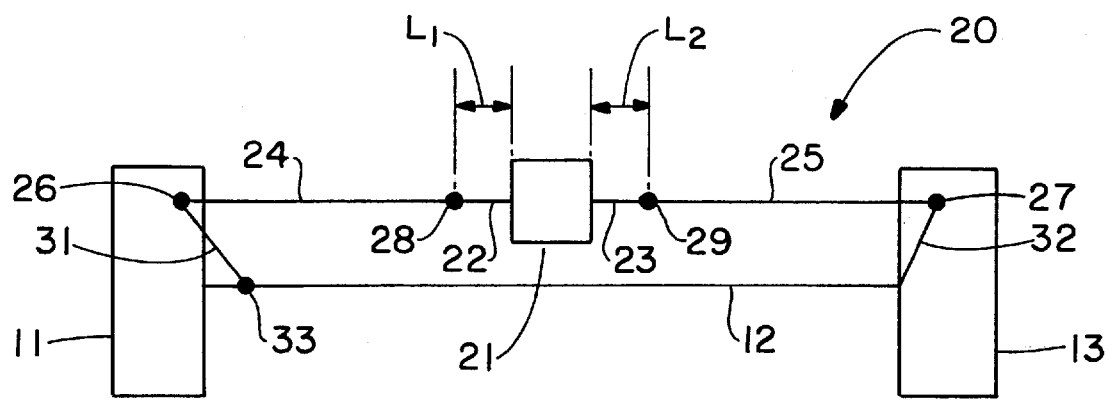
FIG. 2 is a schematic top view of a steering system containing the present invention.

FIG. 2 schematically shows a vehicle steering system that embodies the present invention. The steering system is generally identified by the reference numeral 20 and is comprised of the front axle 12, the front wheels 11 and 13, a mechanical function generator 21, left and right inner tie rods 22 and 23, left and right outer tie rods 24 and 25, left and right outer tie rod ball joints 26 and 27, and left and right inner tie rod ball joints 28 and 29. The steering system 20 also includes left and right steering arms 31 and 32 and king pin 33. Also as shown in FIG. 2, the length of the left inner tie rod 22 is shown by dimension $L_1$ and the length of the right inner tie rod 23 is shown by dimension $L_2$.

For any given set of vehicle parameters, including wheel base, track width, steering arm locations and tie rod locations, it has been found that the length $L_1$ of the left inner tie rod 22 that will result in a condition of perfect Ackerman geometry is mathematically related to the angle θ through which the steering wheel of the vehicle 10 is turned. The relationship may be expressed generally as $L_1(\theta)$. It also has been found that the length $L_2$ of the right inner tie rod 23 required for perfect Ackerman geometry will similarly be mathematically related to the angle θ, however, by a different mathematical function that may be expressed generally as $L_2(\theta)$. The mathematical relationships $L_1(\theta)$ and $L_2(\theta)$ have been found to be mathematically associated with each other in accordance with the following formulae:

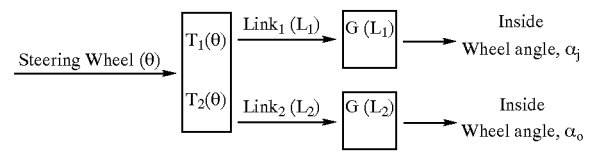

where:
θ is the angle through which the steering wheel of vehicle 10 is turned;
$L_1$ is the length of the left inner tie rod 22;
$L_2$ is the length of the right inner tie rod 23;
$\alpha_i$ is the turning angle of the inside wheel 11;
$\alpha_o$ is the turning angle of the outside wheel 13;
[G] is a transfer function that is determined purely by the layout of the steering system and that relates the length of the vehicle's rack and pinion assembly to the steering wheel angle θ; and
[T] is a transfer function that will generate the correct inside and outside link lengths, $Link_1$ and $Link_2$, for any given rotational input (angle θ) of the steering wheel.

The foregoing formulae are employed to provide a function generation device 21 that is used in lieu of a conventional rack and pinion steering apparatus and to thereby generate the link lengths $Link_1$ and $Link_2$ that will result in virtually perfect Ackerman geometry for the rotational angle θ input from the steering wheel of vehicle 10. A variety of physical means may be utilized to provide the function generator with the capability to transform rotational motion of the steering wheel into the required linear motion of the inner tie rods 22 and 23. Such means include: circular gearing, elliptical gearing, cams, slotted cams, offset slider crank, four-bar linkage and five-bar linkage either individually or in combination with one or more of the others. Since any number of functions can be generated through use of the listed means, the physical placement of the outer tie rods 24 and 25 and the function generation device among other vehicle components situated in the front of vehicle 10 becomes immaterial and allows for additional freedom in determining the placement points.

Figure 4:
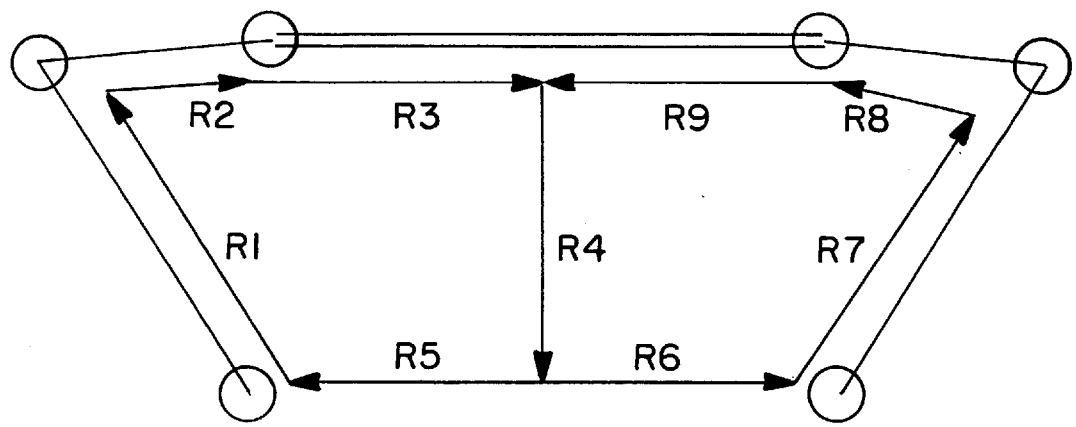
FIG. 4 is a positional vector diagram in two dimensions for the configuration of the vehicle and steering system shown in FIG. 3.
Figure 3:
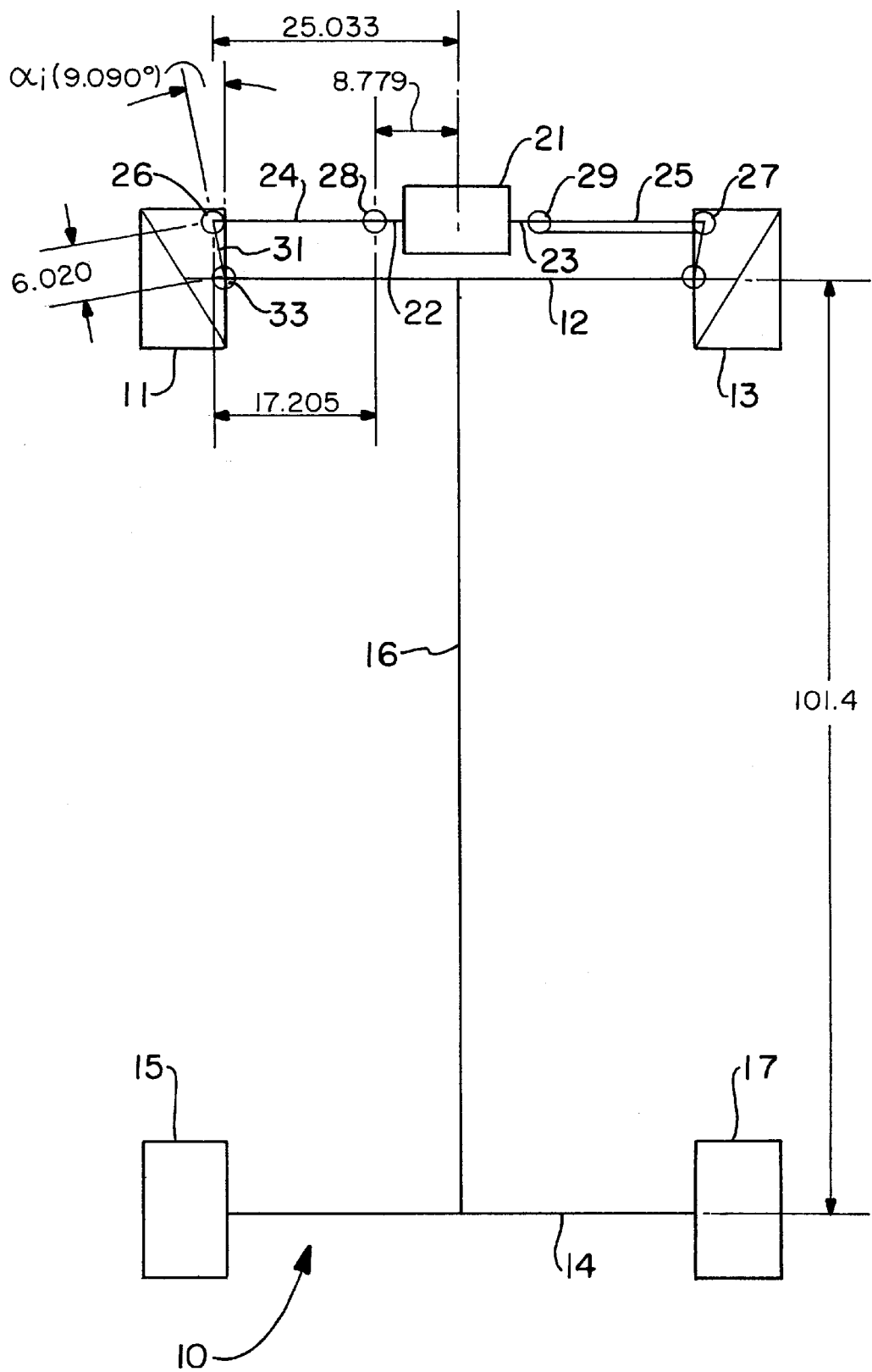
FIG. 3 is a schematic top view of a motor vehicle and steering system of the present invention, wherein typical dimensional data are provided.

Reference to FIGS. 3 and 4 will help to further illustrate the principles of the invention. FIG. 3 is a schematic diagram of the vehicle 10 and the steering system 20 thereof, which has been provided with dimensional data for the wheel base W (101.4 in.), the track width $T_w$ (58 in.), the angle of turn $\alpha_i$ (9.090°=θ1) for the inside wheel 11, the distance between the center of the left outer tie rod ball joint 26 and the center of the left inner tie rod ball joint 28 (17.205 in.), the distance between the centerline of the function generator 21 and the center of the left inner tie rod ball joint 28 (8.779 in.), the distance between the center of the outer tie rod ball joint 26 and the center of the king pin 33 (6.020 in.) and the distance between the centerline of the function generator 21 and the left outer tie rod ball joint 26 (25.033 in.). The steering system 20 has a design steering ratio of 14.

FIG. 4 diagrammatically shows a positional vector drawing in two dimensions for the configuration of steering system 20 as provided in FIG. 3. The scalar values for the vectors $R_1$ through $R_5$ correspond, with one exception, directly to the dimensions shown in FIG. 3 for the left side of the steering system 20. By way of example, the scalar value for vector $R_1$ is 6.020 in., the distance between the center of king pin 33 and the center of the outer tie rod ball joint 26. The scalar value for vector $R_2$ is 17.205 in., the distance between left outer tie rod ball joint 26 and left inner tie rod ball joint 28, etc. The scalar value of vector $R_4$, the exception, will be determined trigonometrically by taking cos(9.090°) times 6.020, the distance between the king pin 33 and the center of the left outer tie rod ball joint 26.

In FIG. 4, two vector loops are shown for steering system 20. The first loop is comprised of vectors $R_1$, $R_2$, $R_3$, $R_4$ and $R_5$, and the second loop includes $R_6$, $R_7$, $R_8$, $R_9$ and $R_4$. Upon application of vector loop analysis to the two loops, it will be observed that:

$$\vec{R_1}+\vec{R_2}+\vec{R_3}+\vec{R_4}+\vec{R_5}=0 \tag{eq. (1)}$$

$$\vec{R_6}+\vec{R_7}+\vec{R_8}+\vec{R_9}+\vec{R_4}=0 \tag{eq. (2)}$$

$$R_3+R_9=K (K=\text{Constant}) \tag{eq. (3)}$$

$$R_1\cos(\theta_1)+R_2\cos(\theta_2)+R_3\cos(\theta_3)+R_4\cos(\theta_4)+R_5\cos(\theta_5)=0 \tag{eq. (4)}$$

$$R_1\sin(\theta_1)+R_2\sin(\theta_2)+R_3\sin(\theta_3)+R_4\sin(\theta_4)+R_5\sin(\theta_5)=0 \tag{eq. (5)}$$

$$R_6\cos(\theta_6)+R_7\cos(\theta_7)+R_8\cos(\theta_8)+R_9\cos(\theta_9)+R_4\cos(\theta_4)= \tag{eq. (6)}$$

$$R_6\sin(\theta_6)+R_7\sin(\theta_7)+R_8\sin(\theta_8)+R_9\sin(\theta_9)+R_4\sin(\theta_4)=0 \tag{eq. (7)}$$

Where:

$R_1$ is the length from the left kingpin center to the left outer tie rod ball joint; $\theta_1$ is the angle from horizontal to vector made by the left kingpin center to the left outer tie rod ball joint $R_2$ is the length from the left outer tie rod ball joint to the left inner tie rod ball joint; $\theta_2$ is the angle from horizontal to vector made by the left outer tie rod ball joint to the left inner tie rod ball joint; and $R_3$ is the length from the left inner tie rod ball joint to the center of the function generator; $\theta_3$ is the angle from horizontal to vector made by the left inner tie rod ball joint to the center of the function generator; and $R_4$ is the length from the center of the function generator to lateral center point of the left and right kingpin centers; $\theta_4$ is the angle from horizontal to vector made by the center of the function generator to lateral center point of the left and right kingpin centers; and $R_5$ is the length from the lateral center point of the left and right kingpin centers to the left kingpin center; $\theta_5$ is the angle from horizontal to vector made by the lateral center point of the left and right kingpin centers and the left kingpin center; and $R_6$ is the length from the lateral center point of the left and right kingpin centers to the right kingpin center; $\theta_6$ is the angle from horizontal to vector made by the lateral center point of the left and right kingpin centers and the right kingpin center; and $R_7$ is the length from the right kingpin center to the right outer tie rod ball joint; $\theta_7$ is the angle from horizontal to vector made by the right kingpin center to the right outer tie rod ball joint; and $R_8$ is the length from the right outer tie rod ball joint to the right inner tie rod ball joint; $\theta_8$ is the angle from horizontal to vector made by the right outer tie rod ball joint to the right inner tie rod ball joint; and $R_9$ is the length from the right inner tie rod ball joint to the center of the function generator; $\theta_9$ is the angle from horizontal to vector made by the right inner tie rod ball joint to the center of the function generator.

Next simplifying the vector loops by dropping unnecessary trigonometric functions, the result is the following:

$$R_1\cos(\theta_1)+R_2\cos(\theta_2)+R_3-R_5=0 \tag{eq. (8)}$$

$$R_1\sin(\theta_1)+R_2\sin(\theta_2)-R_4=0 \tag{eq (9)}$$

$$R_6+R_7\cos(\theta_7)+R_8\cos(\theta_8)-R_9=0 \tag{eq (10)}$$

$$R_7\sin(\theta_7)+R_8\sin(\theta_8)-R_4=0 \tag{eq. (11)}$$

Rearranging the vector loops, $\theta_2$ and $R_3$ can be solved algebraically as follows:

$$R_1\cos(\theta_1)+R_2\cos(\theta_2)+R_3-R_5=0 \tag{eq (8)}$$

$$R_1\sin(\theta_1)+R_2\sin(\theta_2)-R_4=0 \tag{eq(9)}$$

$$R_6+R_7\cos(\theta_7)+R_8\cos(\theta_8)-R_9=0 \tag{eq. (10)}$$

$$R_7\sin(\theta_7)+R_8\sin(\theta_8)-R_4=0 \tag{eq (11)}$$

$$\theta_2=\sin^{-1}\left|\frac{R_4-R_1\sin(\theta_1)}{R_2}\right| \tag{eq. (12)}$$

$$R_3=R_5-R_1\cos(\theta_1)-R_5\cos(\theta_2) \tag{eq. (13)}$$

To solve for $\theta_7$ and $\theta_8$, use of either the Newton Raphson Method or direct solving may be made. By direct solving, the result is:

$$R_7\cos(\theta_7)+R_8\cos(\theta_8)=(K-R_3)-R6 \tag{eq. (14)}$$

$$R_7\sin(\theta_7)+R_8\sin(\theta_8)=R_4 \tag{eq. (15)}$$

$$\theta_8=\sin^{-1}\left(\frac{R_4-R_7\sin(\theta_7)}{R_8}\right) \tag{eq. (16)}$$

$$\theta_7=\cos^{-1}\left|\frac{K-R_3-R_6-R_8\cos\left[\sin^{-1}\left(\frac{R_4-R_7\sin(\theta_7)}{R_8}\right)\right]}{R_7}\right| \tag{eq. (17)}$$

Through the preceding mathematical analysis, the turning angle a, of the outside wheel 13, that is required to produce perfect Ackerman becomes known, since $\theta7=\alpha_o$, and the changes in length for the left inner tie rod 22 and the right inner tie rod 23 needed for perfect Ackerman may be determined by comparing the values $R_3$ and $R_9$ obtained through the analysis with the lengths of the inner tie rods 22 and 23 when vehicle 10 is traveling in a straight path and, wheels 11 and 13 are in an unturned position. In the case where $\alpha_i=9.090°$, $\alpha_o\approx8.263°$, the change in length of the left inner tie rod 22 is an increase of approximately 0.920 in and the change of length of the right inner tie rod 23 is a decrease of approximately 0.864 in.

From the foregoing, it follows that the turning angle $\alpha_o$ of the wheel 13 and the changes in length for the left inner tie rod 22 and the right inner tie rod 23 needed for perfect Ackerman can be ascertained for any rotational angle $\theta$ of the steering wheel of vehicle 10 and inside wheel angle $\alpha_i$ of the wheel 11. A tabulation of such is provided in Table 1 below.

TABLE 1

Wheelbase 101.4 - Track 58 - Ratio 14

| Steering Wheel Position $\theta$ | Inside Wheel Angle $\theta_1$ or $\alpha_i$ | Outside Wheel Angle $\theta_7$ or $\alpha_o$ | Theta Inside Tie Rod $\theta_2$ | Delta Vector Length R (inside) $\Delta L_1$ | Theta Outside Tie Rod $\theta_2$ | Delta Vector Length R (outside) $\Delta L_2$ | Straight Line Length R (outside) y = .0816x $\Delta L'_2$ | y = 6e-06*x^3+.0009* x^2-.1037*x$\Delta L''_2$ |
|---|---|---|---|---|---|---|---|---|
| 0 | 0 | 0 | 0.002007 | 0 | 0.002007 | 0 | 0 | 0 |
| 14 | 1 | 0.990117 | 0.060299 | 0.103683 | 0.049767 | -0.1027802 | -0.0816 | -0.1028 |
| 28 | 2 | 1.960864 | 0.124602 | 0.206992 | 0.094774 | -0.2038579 | -0.1632 | -0.2038 |
| 42 | 3 | 2.912839 | 0.194898 | 0.309976 | 0.133366 | -0.303183 | -0.2448 | -0.3032 |
| 56 | 4 | 3.846634 | 0.271166 | 0.41261 | 0.165875 | -0.4007822 | -0.3264 | -0.4008 |
| 70 | 5 | 4.762834 | 0.353383 | 0.514871 | 0.192617 | -0.4966846 | -0.408 | -0.4968 |
| 84 | 6 | 5.66202 | 0.441524 | 0.616734 | 0.213894 | -0.5909211 | -0.4896 | -0.5911 |
| 98 | 7 | 6.544762 | 0.535562 | 0.718176 | 0.229987 | -0.6835242 | -0.5712 | -0.6839 |
| 112 | 8 | 7.411625 | 0.635469 | 0.819177 | 0.241164 | -0.7745279 | -0.6528 | -0.7751 |
| 126 | 9 | 8.263159 | 0.741216 | 0.919713 | 0.247677 | -0.863967 | -0.7344 | -0.8648 |
| 140 | 10 | 9.099906 | 0.852771 | 1.019764 | 0.249764 | -0.9518774 | -0.816 | -0.953 |
| 154 | 11 | 9.922399 | 0.9701 | 1.119311 | 0.247649 | -1.0382953 | -0.8976 | -1.0398 |
| 168 | 12 | 10.73115 | 1.09317 | 1.218332 | 0.241541 | -1.1232577 | -0.9792 | -1.1252 |
| 182 | 13 | 11.52668 | 1.221944 | 1.316809 | 0.231637 | -1.2068014 | -1.0608 | -1.2092 |
| 196 | 14 | 12.30947 | 1.356385 | 1.414724 | 0.218124 | -1.2889634 | -1.1424 | -1.2919 |
| 210 | 15 | 13.08002 | 1.496452 | 1.512058 | 0.201172 | -1.3697817 | -1.224 | -1.3733 |
| 224 | 16 | 13.83878 | 1.642105 | 1.608795 | 0.180945 | -1.4492923 | -1.3056 | -1.4534 |
| 238 | 17 | 14.58623 | 1.793302 | 1.704917 | 0.157595 | -1.5275322 | -1.3872 | -1.5323 |
| 252 | 18 | 15.32281 | 1.949999 | 1.800408 | 0.131261 | -1.6045378 | -1.4688 | -1.61266 |
| 266 | 19 | 16.04895 | 2.112152 | 1.895254 | 0.102077 | -1.680345 | -1.5504 | -1.6866 |
| 280 | 20 | 16.76508 | 2.279712 | 1.989438 | 0.070164 | -1.7549895 | -1.632 | -1.762 |
| 294 | 21 | 17.47162 | 2.452634 | 2.082946 | 0.035637 | -1.828506 | -1.7136 | -1.8364 |
| 308 | 22 | 18.16896 | 2.630867 | 2.175765 | -0.001398 | -1.9009292 | -1.7952 | -1.9097 |
| 322 | 23 | 18.85751 | 2.814362 | 2.267881 | -0.040843 | -1.9722927 | -1.8768 | -1.982 |
| 336 | 24 | 19.53763 | 3.003066 | 2.359281 | -0.082606 | -2.0426297 | -1.9584 | -2.0533 |
| 350 | 25 | 20.20971 | 3.196927 | 2.449952 | -0.126605 | -2.1119728 | -2.04 | -2.1238 |
| 364 | 26 | 20.87411 | 3.395892 | 2.539883 | -0.172761 | -2.1803538 | -2.1216 | -2.1933 |
| 378 | 27 | 21.53118 | 3.599903 | 2.629061 | -0.221003 | -2.2478037 | -2.2032 | -2.2619 |
| 392 | 28 | 22.18126 | 3.808906 | 2.717477 | -0.271266 | -2.3143532 | -2.2848 | -2.3297 |
| 406 | 29 | 22.82469 | 4.022844 | 2.805119 | -0.323491 | -2.3800318 | -2.3664 | -2.3967 |
| 420 | 30 | 23.46179 | 4.241657 | 2.891978 | -0.377622 | -2.4448687 | -2.448 | -2.463 |
| 434 | 31 | 24.0929 | 4.465286 | 2.978043 | -0.433612 | -2.5088921 | -2.5296 | -2.5285 |
| 448 | 32 | 24.718331 | 4.69367 | 3.063305 | -0.491415 | -2.5721296 | -2.6112 | -2.5934 |
| 462 | 33 | 25.33835 | 4.92675 | 3.147756 | -0.550991 | -2.6346082 | -2.6928 | -2.6576 |
| 476 | 34 | 25.95329 | 5.164461 | 3.231386 | -0.612306 | -2.6963541 | -2.7744 | -2.7212 |
| 490 | 35 | 26.56345 | 5.40674 | 3.314187 | -0.675329 | -2.7573927 | -2.856 | -2.7843 |
| 504 | 36 | 27.16909 | 5.653525 | 3.396153 | -0.740031 | -2.8177489 | -2.9376 | -2.8467 |
| 518 | 37 | 27.77051 | 5.904749 | 3.477274 | -0.80639 | -2.8774469 | -3.0192 | -2.9087 |
| 532 | 38 | 28.36799 | 6.160346 | 3.557544 | -0.874387 | -2.9365102 | -3.1008 | -2.9702 |
| 546 | 39 | 28.96178 | 6.420251 | 3.636956 | -0.944006 | -2.9949615 | -3.1824 | -3.0313 |
| 560 | 40 | 29.55216 | 6.684396 | 3.715503 | -1.015233 | -3.0528231 | -3.264 | -3.092 |

Figure 5:
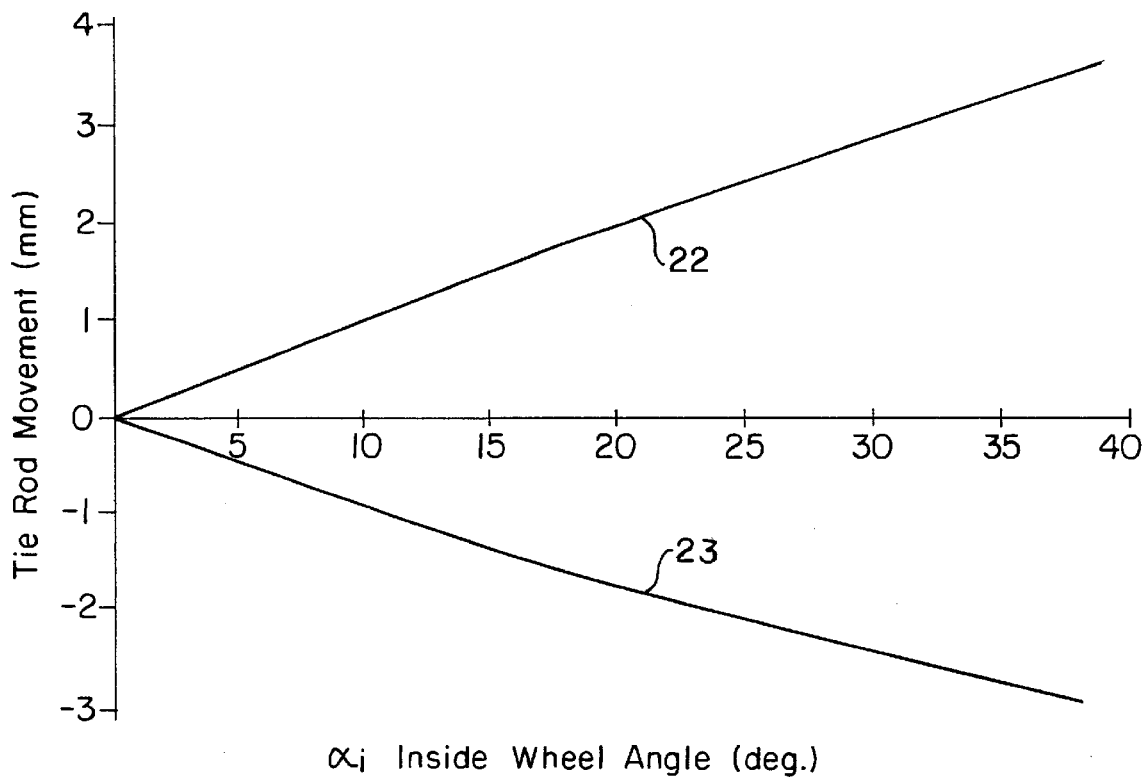
FIG. 5 is a graph wherein changes in lengths of inner tie rod components of the steering system shown in FIG. 3, required to yield a condition of perfect Ackerman have been plotted.

FIG. 5 provides a graph wherein the values for $\Delta L_1$ and $\Delta L_2$ corresponding to the values for $\alpha_i$ shown in Table 1 have been plotted. From an inspection of FIG. 5, it will be observed that in the example presented, i.e., the case where vehicle 10 executes a left hand turn, the change in lenght $\Delta L_1$ of the left inner tie rod 22 will increase in a non-linear fashion as $\alpha_i$ increases and the change in length $\Delta L_2$ of the right inner tie rod 23 will decrease in a non-linear manner as $\alpha_i$ increases. It will further be observed that for any given non-zero value of $\alpha_i$, the absolute value of the change in length $\Delta L_1$ of the left inner tie rod 22 will be greater than the absolute value of the change in length $\Delta L_2$ of the right inner tie rod 23. Thus, the left inner tie rod 22 must experience a larger change in length than the right inner tie rod 23 in order that a condition of perfect Ackerman can be attained.

Figure 6:
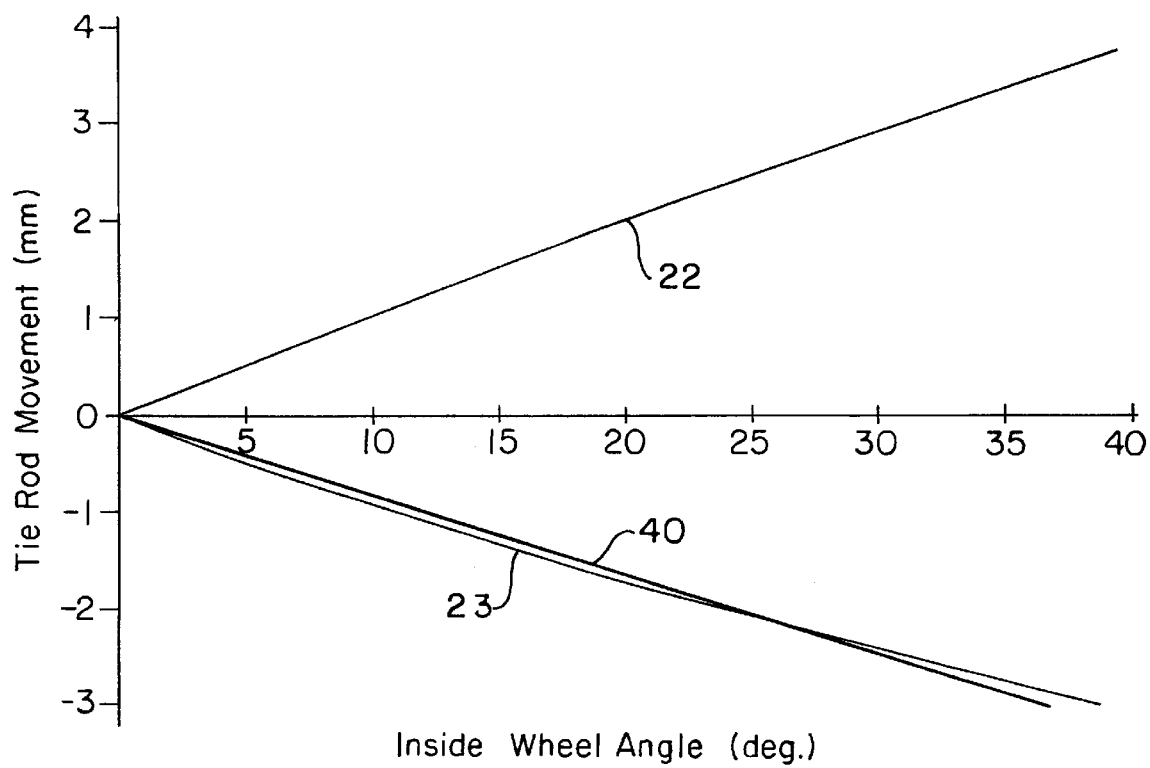
FIG. 6 is a graph which, in addition to including the inner tie rod length changes plotted in FIG. 5, further includes length changes attainable through use of a first embodiment of the present invention.

Referring back to Table 1, it will be noted that to the right of the column headed with $\Delta L_2$ there appear two additional columns headed $\Delta L_2'$ and $\Delta L_2''$. The numerical values presented in the additional columns have been generated by the application of least square approximation techniques. In the case of the column headed $\Delta L_2'$, the linear equation $$y=0.0816x$$

was applied, with $R^2=0.9848$. The applied equation provides a linear approximation of the relationship that yielded the $\Delta L_2$ values shown in Table 1 and assumes that the mechanical function generator 21 of the steering system 20 is comprised of simple gearing means. FIG. 6 is a graph showing not only the values for $\Delta L_1$ and $\Delta L_2$ plotted previously in FIG. 5, but also the values of $\Delta L_2'$ at 40 taken from Table 1. An examination of FIG. 6 will reveal that for values of $\alpha_i$ less than aproximately 30 degrees the decrease in the length $\Delta L_2'$ of the outer tie rod 23 will be less than the ideal or requiired decrease in the length $\Delta L_2$ and for values of $\alpha_i$ greater than 30 degrees the decrease in the length $\Delta L_2'$ will be more than ideal or required decrease in the length $\Delta L_2$. Thus, with the mechanical function generator 21 being comprised of a relatively simple gearing means a condition approximating that which would provide perfect Ackerman may be achieved. A percent error analysis performed on the values of $\Delta L_2$ and $\Delta L_2'$ plotted in FIG. 6 will show that as $\alpha_i$ decreases within a range from approximately 30 degrees to 1 degree, the percent error becomes increasingly positive, ranging from zero percent to nearly +26 percent, and that as a, increases within a range from approximately 30 degrees to 40 degrees, the percent error becomes increasingly negative, varying from zero percent to nearly −6.5 percent.

Figure 7:
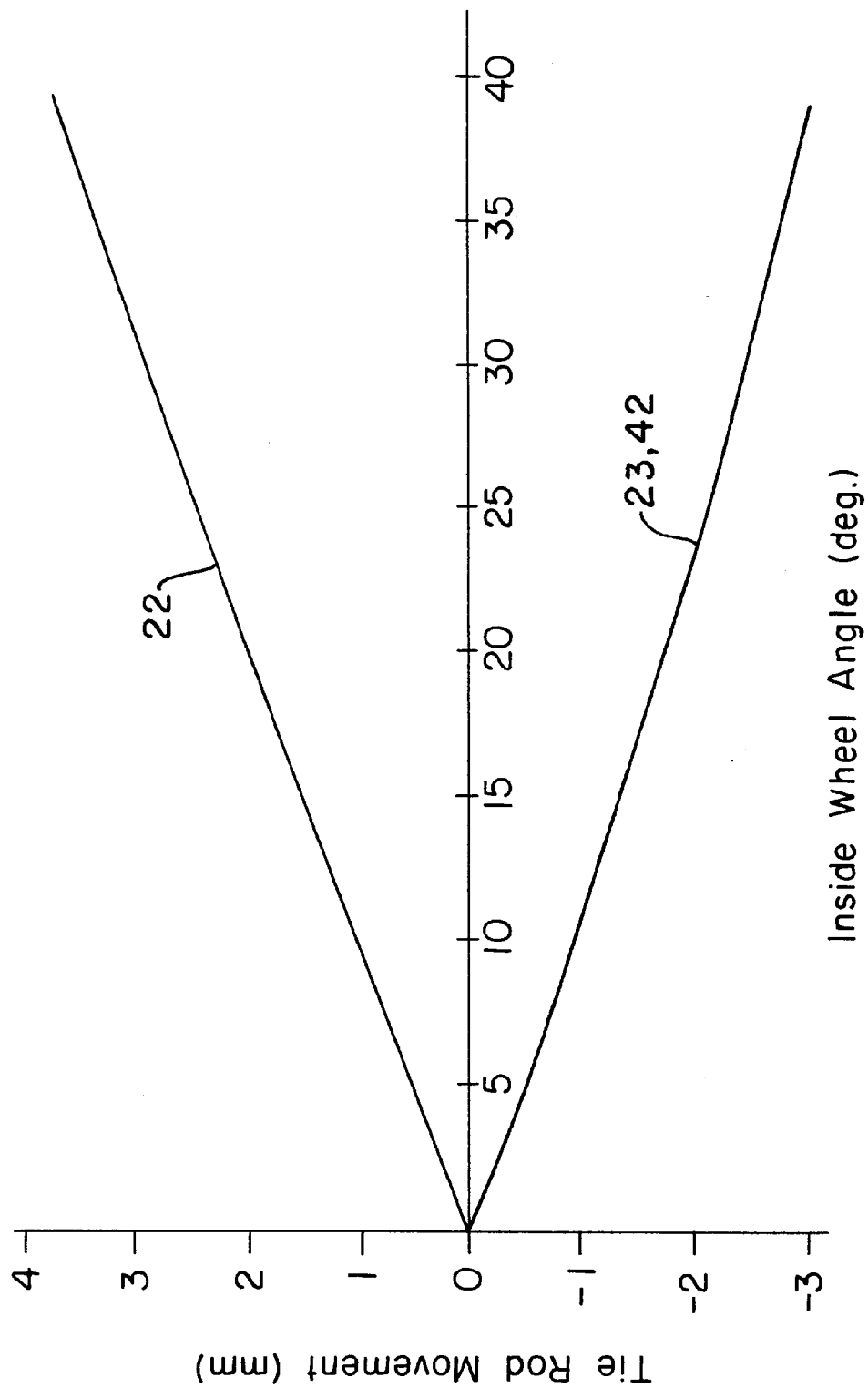
FIG. 7 is a graph which, in addition to including the inner tie rod length changes plotted in FIG. 5, further includes length changes attainable through use of a second embodiment of the present invention.

Referring back to the column headed $\Delta L_2"$ in Table 1, it will be observed that the equation $$y = -6e - 6x^3 + 0.0009x^2 - 0.1037x$$

was used, with $R^2=1$. This second mathematical function provides a non-linear approximation of the relationship yielding the $\Delta L_2$ values appearing in Table 1 and comtemplates use of a mechanical function generator 21 made up of a relatively complex mechanical arrangement. FIG. 7 provides a graphical plot of the values of $\Delta L_2"$ at 42 taken from Table 1, along with the values of $\Delta L_1$ and $\Delta L_2$ as they were previously shown in FIG. 5. Upon inspection of FIG. 7, it will be noted that the curves plotted for $\Delta L_2$ and $\Delta L_2"$ are virtually indistinguishable for all indicated values of $\alpha_i$. Thus, a condition of nearly perfect Ackerman may be created by with the mechanical function generator 21 when it is constructed of more complex mechanical means which produces a change in length of the right inner tie rod 23 in accord with the above provided non-linear function. A percent error analysis serves to further illustrate the degree to which nearly perfect Ackerman may be attained. Analysis of the different values of $\Delta L_2$ and $\Delta L_2"$ shown in Table 1 will reveal that for values of $\alpha_i$ within a range of 2 degrees to 5 degrees, the percent error is practically negligible, ranging from +0.01 percent to −0.01 percent. For values of $\alpha_i$ falling within the range of 6 degrees to 40 degrees, the percent error will vary from −0.03 percent at $\alpha_i=6$ degrees to −1.27 percent at $\alpha_i=40$ degrees. At $\alpha_i=1$ degree, percent error will be −0.03 percent.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A motor vehicle steering box for use with a steering system of a vehicle to control Ackerman geometry, the steering system having two steerable wheels, the steering box comprising:

means for adjusting the turning angle $R_i$ of one steerable wheel relative to the turning angle $R_o$ of the other steerable wheel such that the center of the turning radius $R_i$ of the one steerable wheel coincides with the center of the turning radius $R_o$ of the other steerable wheel;

a first connecting mechanism linking the means for adjusting to a steering column and steering wheel of the steering system;

a second connecting mechanism linking the means for adjusting to a first tie rod of a linkage apparatus of the steering system; and a third connecting mechanism linking the means for adjusting to a second tie rod of the linkage apparatus.

2. A motor vehicle steering box as claimed in claim 1, wherein the first tie rod is a left inner tie rod and the second tie rod is a right inner tie rod, the left inner tie rod and the right inner tie rod being laterally movable by the means for adjusting in response to rotation of the steering wheel.

3. A motor vehicle steering box as claimed in claim 1, wherein the means for adjusting employs a means for tie rod movement selected from a group consisting of a mechanical mechanism, a hydraulic mechanism and an electrical mechanism to move the left inner tie rod and the right inner tie rod in response to rotation of the steering wheel.

4. A motor vehicle steering box as claimed in claim 3, wherein the means for moving the tie rods moves the left inner tie rod a first lateral distance which turns the steerable left front wheel at a left front wheel turning angle and the means for moving moves the right inner tie rod a second lateral distance which turns the steerable right front wheel at a right front wheel turning angle.

5. A motor vehicle steering box for use with a steering system of a vehicle to control Ackerman geometry, the steering system having two steerable wheels, the steering box comprising:

means for controlling, during a turning event, the Ackerman geometry of the steerable wheels;

a first connecting mechanism linking the means for controlling to a steering column and steering wheel of the steering system;

a second connecting mechanism linking the means for controlling to a first tie rod of a linkage apparatus of the steering system; and a third connecting means linking the means for controlling to a second tie rod of the linkage apparatus.

6. A motor vehicle steering box as claimed in claim 5, wherein the means for controlling maintains a perfect Ackerman geometry.

7. A motor vehicle steering box as claimed in claim 5, wherein the first tie rod is a left inner tie rod and the second tie rod is a right inner tie rod, the left inner tie rod and the right inner tie rod being laterally movable by the means for adjusting in response to rotation of the steering wheel.

8. A motor vehicle steering box as claimed in claim 5, wherein the means for adjusting employs a means for tie rod movement selected from a group consisting of a mechanical mechanism, a hydraulic mechanism and an electrical mechanism to move the left inner tie rod and the right inner tie rod in response to rotation of the steering wheel.

9. A motor vehicle steering box as claimed in claim 8, wherein the means for moving the tie rods moves the left inner tie rod a first lateral distance which turns the steerable left front wheel at a left front wheel turning angle and the means for moving moves the right inner tie rod a second lateral distance which turns the steerable right front wheel at a right front wheel turning angle.

10. A motor vehicle steering box for use with a steering system of a vehicle to control Ackerman geometry, the steering system having two steerable wheels, the steering box comprising:

a single means for controlling, during a turning event, the Ackerman geometry of the steerable wheels;

a first connecting mechanism linking the means for controlling to a steering column and steering wheel of the steering system;

a second connecting mechanism linking the means for controlling to a first tie rod of a linkage apparatus of the steering system; and a third connecting means linking the means for controlling to a second tie rod of the linkage apparatus, the means for controlling independently moving the first tie rod and the second tie rod, the first tie rod being moved a first distance and the second tie rod being moved a second distance to change the turning angle of one steerable wheel relative to the turning angle of the other steerable wheel.

* * * * *